Aug. 15, 1933.    S. C. PORTER    1,922,454
CONTROL AND LOCKING MECHANISM
Filed July 18, 1929    3 Sheets-Sheet 1
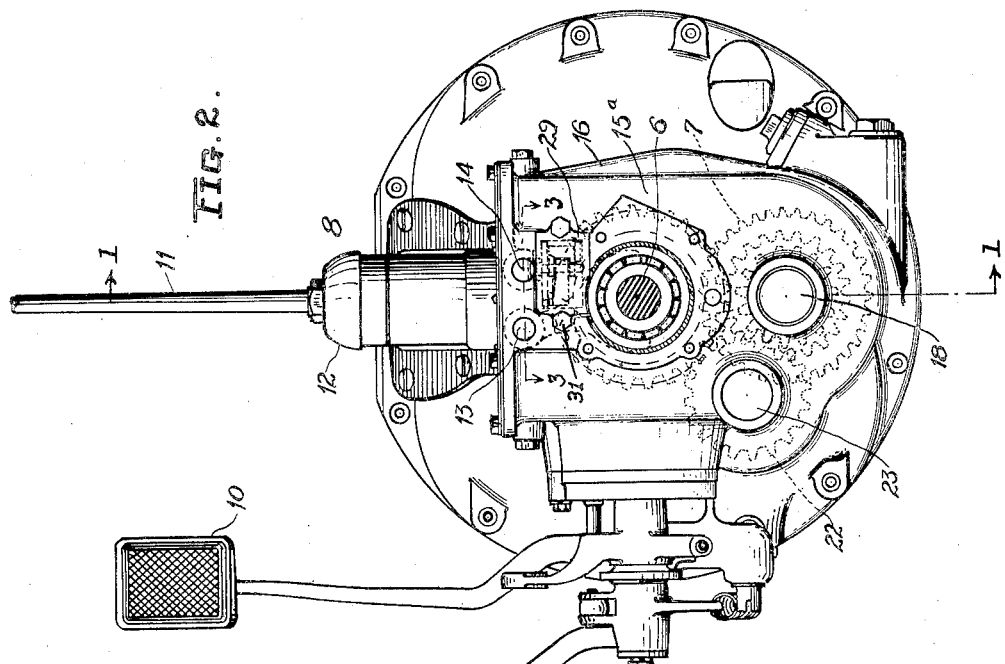
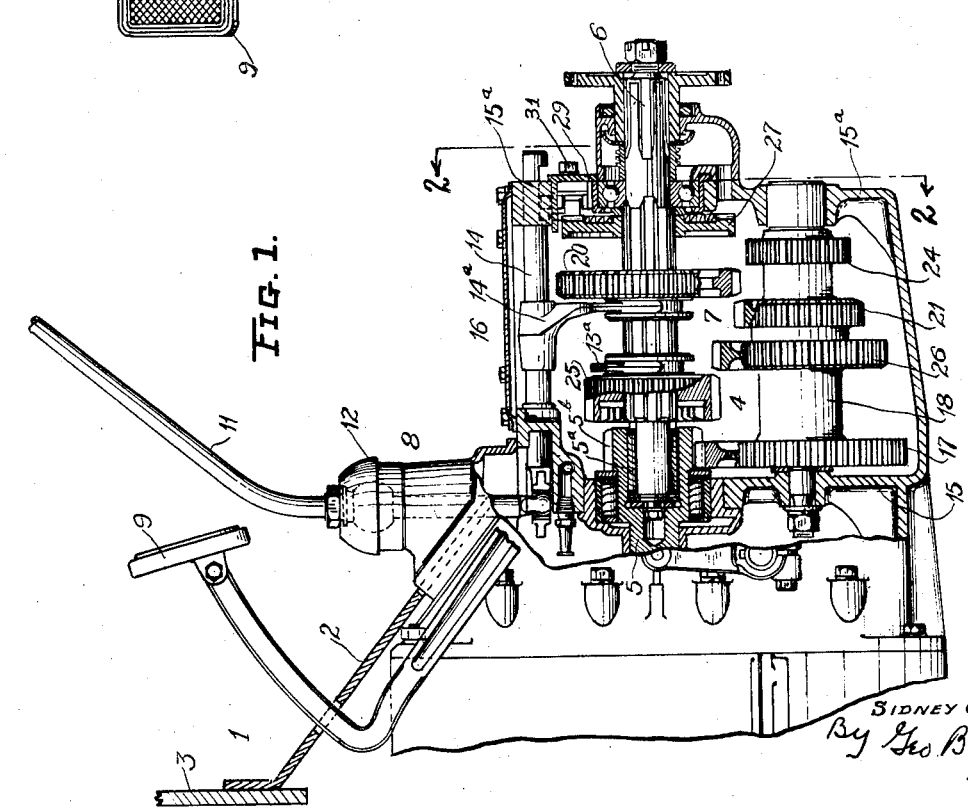
INVENTOR.
SIDNEY C. PORTER,
By Geo. B Pitts
ATTORNEY Aug. 15, 1933.　　　　　S. C. PORTER　　　　　1,922,454
CONTROL AND LOCKING MECHANISM
Filed July 18, 1929　　　3 Sheets-Sheet 2

INVENTOR
SIDNEY C. PORTER
By
Geo. A Pitts
ATTORNEY

Aug. 15, 1933. S. C. PORTER 1,922,454
CONTROL AND LOCKING MECHANISM
Filed July 18, 1929 3 Sheets-Sheet 3

INVENTOR
SIDNEY C. PORTER.
By Geo. A. Pitts
ATTORNEY

Patented Aug. 15, 1933

1,922,454

UNITED STATES PATENT OFFICE 1,922,454

CONTROL AND LOCKING MECHANISM

Sidney C. Porter, Newell, W. Va.

Application July 18, 1929. Serial No. 379,205

12 Claims. (Cl. 192—4)

This invention relates to a control and locking means for a shaft or other rotatable element adapted to rotate in one direction or either direction. It is applicable to a shaft or other element which is driven in either direction but which, due to any tendency—such as gravitation applied to or through a member or body driven or operated by said shaft or element directly or indirectly, may rotate in one direction whether in connected relation to its driving mechanism or disconnected therefrom.

I have, for illustrative purposes, shown my invention as applied to the propeller shaft of a vehicle. For example, in driving a vehicle up a grade or hill and a stop is made, my improved locking means prevents backward gravitation of the vehicle, making it unnecessary for the driver to apply the brakes or either thereof to hold the vehicle stationary, and in again starting to ascend the grade or hill it permits the driver to supply fuel to the engine and start the vehicle in motion forwardly in the same manner as though the vehicle was on a level roadway.

One object of the invention is to provide an improved control mechanism which is capable of automatically preventing or locking a shaft or other rotatable element against rearward movement while permitting and without affecting its movement or rotation forwardly.

Another object of the invention is to provide an improved control mechanism that is both positive and quick in operation and relatively simple in construction.

Another object of the invention is to provide an improved control mechanism inter-connected with the shift means of a change speed and reversing mechanism so as to be actuated or controlled thereby.

A further object of the invention is to provide an improved control mechanism in which provision is made to permit better control of a vehicle particularly where traffic conditions make it necessary to repeatedly stop the car.

Other objects of the invention will be apparent to those skilled in the art to which my invention relates from the following description taken in connection with the accompanying drawings, wherein Fig. 1 is a fragmentary view of a vehicle and a sectional view of a transmission mechanism for the vehicle on the line 1—1 of Fig. 2, such mechanism being shown in neutral position and having correlated with it a control means embodying my invention.

Fig. 2 is a section on the line 2—2 of Fig. 1.

Figure 3:
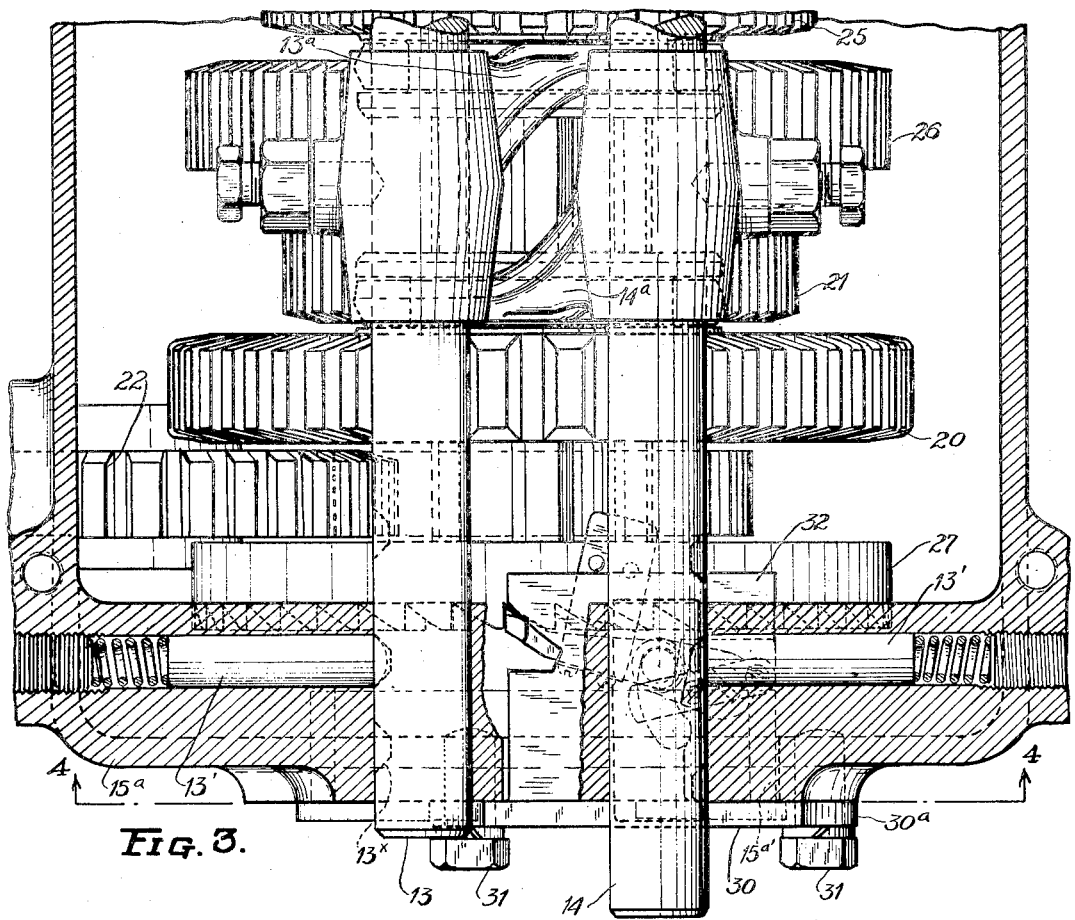
Fig. 3 is a fragmentary section on the line 3—3 of Fig. 4.

In the drawings, 1 indicates a suitable wheel mounted vehicle, a portion only of which is shown. The parts shown comprise floor boards 2 and a front wall 3. 4 indicates a transmission mechanism of suitable construction through which the power of the engine is transmitted, such mechanism including a shaft 5 adapted to be connected to and driven by the engine shaft (not shown), a shaft 6 adapted to be connected to the vehicle propeller shaft (not shown), transmission gears 7 for driving the vehicle forwardly at different speeds, for example, three speeds (low, second and high) or rearwardly at one speed, and a shifting means 8 for changing the gear ratios to effect different speeds in the forward driving direction, and for shifting the gears to effect driving in the rearward direction. The shaft 5 and engine shaft are adapted to be connected together, or disconnected by a suitable clutch (not shown), the operation of which is controlled by the usual foot pedal 9. 10 indicates a foot pedal for operating the service brake (not shown). The shifting means 8 comprise a lever 11 pivotally mounted in any suitable manner in a casing 12 and a pair of plungers 13, 14, adapted to be operated by the lower end of the lever 11 in the usual manner. The plungers 13, 14, are preferably mounted to slide endwise in openings formed in inner and outer end walls 15, 15a, of the housing 16 for the transmission mechanism 4. Each of the plungers 13, 14, is yieldingly held in neutral position, or in either of its shifted positions by a normally spring-operated pin 13' the free end of which removably fits into any one of three notches 13x formed in the adjacent plunger 13 or 14. These plungers carry suitable yokes 13a, 14a, which engage certain of the gears 7 and effect shifting thereof to drive the vehicle forwardly at the desired speed or rearwardly. The shaft 5 is suitably mounted in a bearing carried by the inner end wall 15 of the housing 16 and is connected to a fly wheel (not shown) within the inner end of the housing. The outer end of the shaft 5 is enlarged to form a socket 5a in which the inner end of the shaft 6 is supported and on its exterior the end of the shaft 5 is provided with gear teeth 5b which mesh with a gear 17 fixed to a countershaft 18. The shaft 18 is mounted in the inner end wall 15 and outer end wall 15a. 20 indicates a gear splined on the shaft 6 and movable into mesh with a gear 21 fixed to the shaft 18 to effect driving at low speed or movable into mesh with an idler 22 on a shaft 23 which in turn meshes with a gear 24 fixed to the shaft 18 to effect driving rearwardly. 25 is a compound gear splined to the shaft 6 and movable into mesh with a gear 26 fixed to the shaft 18 to effect driving at second speed or movable into mesh with the gear 5b to effect driving at high speed. The plunger 13 is operated by the lever 11 to shift the gear 25 into mesh with the gear 26 or into mesh with the gear 5b, whereas the plunger 14 is operated by the lever 11 to shift the gear 20 into mesh with the gear 21 or the idler 22. It will be understood that the transmission mechanism and the remaining parts so far described may be of any desired construction and that the operating elements 13, 14, may be movable other than endwise as shown. The plunger 14 is cutaway throughout a portion of its length, as shown at 26', to form thrust walls 26a, 26b, as shown in Figs. 1, 3, 8 and 10, the purpose of which will later appear.

Figure 4:
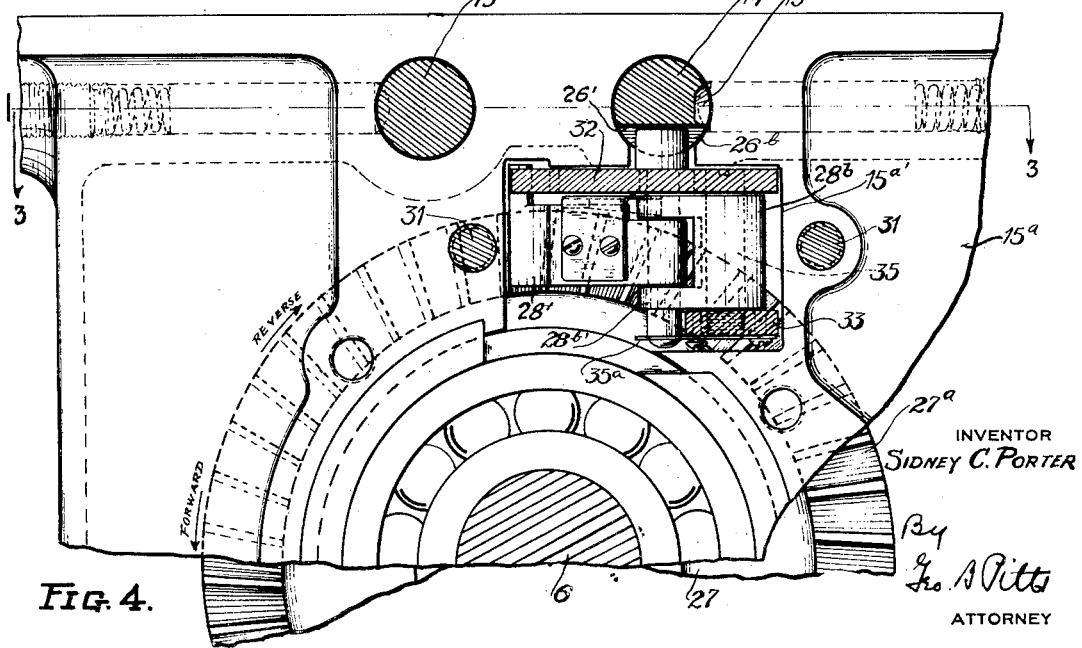
Fig. 4 is a fragmentary view on the line 4—4 of Fig. 3.
Figure 5:
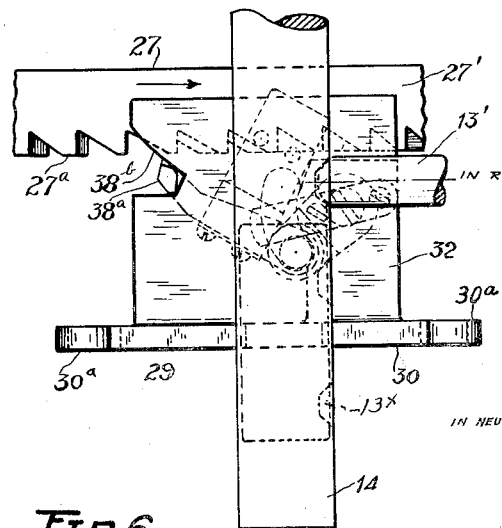
Fig. 5 is a fragmentary plan view showing the position of the locking pawl when the transmission mechanism is set to drive the vehicle rearwardly; that is, the shift lever is in reverse position.
Figure 7:
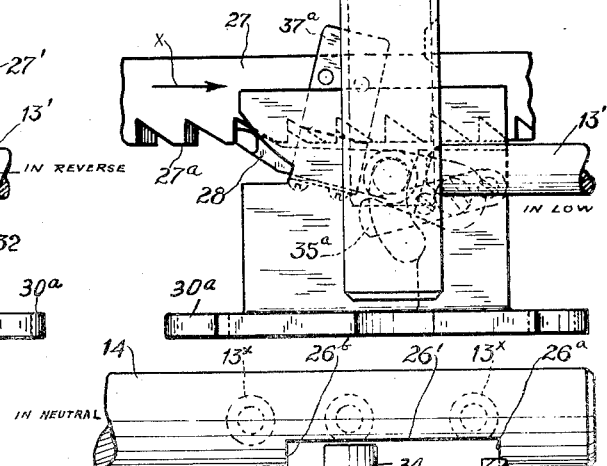
Fig. 7 is a view similar to Fig. 6, but showing the engagement of the locking pawl with the rack or gear to lock the vehicle against rearward movement.

27 indicates a rotatable member forming one element of any improved control and locking means. Where my invention is applied to a vehicle, the member 27 is keyed to the propeller shaft 6, as shown, since this shaft rotates whenever the vehicle moves, whether due to gravitation or otherwise or the application of its motive power. The member 27 is preferably arranged within the housing 16 and relatively close to the inner face of its end wall 15a, as shown in Figs. 1 and 3, the arrows in Figs. 4, 5, 6 and 7 indicating the direction of movement of the member 27. 27a indicates ratchet teeth preferably provided on one side face of the member 27, near its periphery. 28 indicates as an entirety a pawl adapted to engage the teeth 27a and lock the member 27 against rearward movement and through it prevent rotation of the shaft 6 in the reverse direction so that the vehicle cannot gravitate or be pushed in the rearward direction, except under the conditions hereinafter set forth. In this arrangement, the pawl 28 is mounted to move laterally to engage with the teeth 27a and disengage therefrom, thereby eliminating any tendency of the weight of the pawl or jarring of the vehicle to affect its movement in either direction. 29 indicates as an entirety a mounting for the pawl 28. The mounting 29 comprises a base member 30 having at its opposite ends lugs 30a, which are removably secured to the end wall 15a by suitable cap screws 31, and spaced webs or flanges 32, 33, preferably formed integrally with and extending inwardly from the base member 30. As shown, the wall 15a is formed with an opening 15a' through which the webs 32, 33, extend to support the pawl 28 in relation to the ratchet teeth 27a. The pawl 28 comprises a pair of articulatable members 28a, 28b, pivotally connected by a pivot pin 34. The member 28b is pivotally mounted on a shaft 35, the lower end of the latter being threaded or screwed into an opening formed in the web 33 and its upper end being countersunk into an opening formed in the web 32 (see Figs. 4 and 10), whereby the shaft is supported by these webs. The outer end of the pawl member 28b is provided with knuckles 28b' between which the inner end of the pawl member 28a fits and this end and the knuckles 28b' are formed with aligned openings to receive the pin 34. The upper end of the pin 34 extends through an elongated slot 32a formed in the web 32, the end walls of the slot forming stops to limit the swinging movement of the pawl member 28b in either direction and movement of the pawl member 28a when retracted or in inactive relation to the ratchet 27 (as shown in Fig. 5), or in active relation to the teeth 27a (see Figs. 6 and 9) or in locking engagement with the teeth 27a (as shown in Fig. 7). The upper free end of the pin 34 extends beyond the web 32 into the cut-away 26' in the path of movement of the thrust walls 26a, 26b, so that when the plunger 14 is moved to either of its extreme positions, one of these walls will engage the pin 34 and act therethrough to swing the pawl member 28b about the shaft 35 and thus to either move the pawl member 28a to its inactive position (see Fig. 5) or project it forwardly to its active position into engagement or into position ready to engage with the teeth 27a, upon movement of the member 27 in the rearward direction due to backing of the vehicle, as will later appear. The upper free end of the pin 34 preferably has a diameter greater than the width of the slot 32a so that it may be supported by and slide on the upper face of the web 32. As the pin 34 is directly below the plunger 14, the latter will prevent the pin from moving upwardly. The lower end of the pin 34 is extended so as to engage a leaf spring 35a fixed to the lower face of the web 33 by suitable means, such as screw 36. The purpose of the spring 35a is to yieldingly hold the pin 34 in either position to which it is moved, so that the pawl member 28b cannot be moved in either direction due to jolts or jars incident to the driving of the vehicle. As shown, the free portion of the spring is disposed intermediate the extreme positions of the pin 34 and is preferably wide enough to substantially engage the side thereof when in either position. When the pin is moved from one position to the other, it engages the spring and flexes it so as to pass by or over it. For this purpose the lower end of the pin is rounded to facilitate its engagement with and flexing of the spring.

37 indicates as an entirety means interposed between the rotatable member 27 and pawl member 28a for automatically controlling or actuating the latter when in active position dependent on the direction of movement of the member 27; that is, so long as the member 27 is rotating forwardly due to movement of the vehicle forwardly or does not rotate rearwardly, after the vehicle has been stopped, the pawl member 28a will be maintained in what may be termed its active position, but out of engagement with the teeth 27a; but upon rotation of the member 27 in the rearward direction (unless the gears 7 are shifted into "reverse") the means 37 will swing the pawl member 28a into engagement with the teeth 27a and thus lock it against further movement, as shown in Fig. 7. The actuating means 37 may comprise a device having frictional contact with a portion of the member and connected to the pawl member 28a. By preference, the device consists of a plate formed of resilient metal fixedly connected to the pawl member 28a and having an arm 37a extending across the peripheral edge 27' of the member 27 and yieldingly engaging therewith, as the member rotates, this edge being relatively wide to provide ample engaging surface for the device 37. The under face of the arm 37a may be provided with a replaceable shoe to prevent wear on the plate due to the resulting friction; the shoe being formed of suitable friction material. Due to the engagement of the device 37 with the rotatable member 27, movement of the latter in the forward direction (that is, the forward driving direction of the vehicle) will swing the pawl member 28a about its pivot pin 34 away from the teeth 27a to its active position (see Figs. 6 and 9) and maintain it in such position so long as the member 27 does not rotate in the rearward direction; but should the member 27 rotate in the rearward direction, it will move the arm 37a in the opposite direction and swing the pawl member 28a about its pivot pin 34 into engagement with the teeth 27a (see Fig. 7) and lock the member 27 against further rearward movement, the effect of which is to prevent rearward movement of the vehicle. Upon rotation of the member 27 in the forward direction, it will act through the device 37 to swing the pawl member 28a back to its active position. It will thus be seen that the swinging of the pawl member 28a into engagement with and disengagement from the teeth 27a is automatically controlled by the member 27 according to its direction of rotation.

When it is desired to drive the vehicle rearwardly the shift lever 11 is operated to connect the propeller shaft 6 in "reverse", such operation causing a movement of the plunger 14 to the position shown in full lines in Fig. 5; in such movement of the plunger 14, the thrust wall 26b engages the pin 34 and swings the pawl member 28a, 28b, to the position shown in Fig. 5, thereby moving the pawl member 28a to its inactive position, so that the vehicle may be driven rearwardly freely; when it is desired to gravitate the vehicle or manually move it rearwardly, the shift lever is first moved into "reverse", to move the pawl into its inactive position, and then into "neutral" in which position the transmission mechanism is disconnected from the shaft 6. If now the lever 11 is shifted into "low" it will slide the plunger 14 to its other extreme position; in such movement the thrust wall 26a will engage the upper end of the pin 34 and swing the pawl members 28a, 28b, to the position shown in Fig. 7. As prior to the shifting of the plunger 14 to the Fig. 7 position the member 27 was rotating rearwardly, the actuating device 37 was moved to its rearward position and accordingly in the movement of the pawl members 28a, 28b, to the Fig. 7 position, the nose of the pawl member 28a is projected into engagement with the teeth 27a, but upon forward rotation of the member 27, the latter will act on the device 37 and through it swing the pawl member 28a to the position shown in Fig. 6.

From the foregoing description it will be understood that Fig. 5 shows the position of the pawl members 28a, 28b, when the transmission mechanism is in "reverse" and Fig. 7 shows the position of these members when the transmission mechanism has been shifted from "reverse" to "low".

Figure 6:
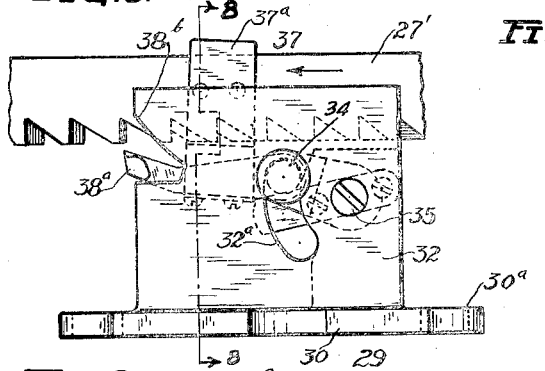
Fig. 6 is a fragmentary plan view showing the position of the locking pawl when the transmission mechanism is set to drive the vehicle forwardly, the shifting plunger being omitted.
Figure 8:
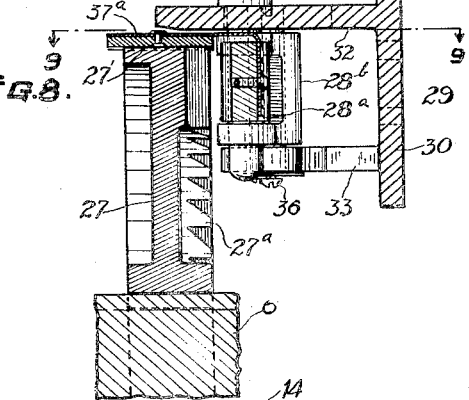
Fig. 8 is a section on the line 8—8 of Fig. 6.
Figure 9:
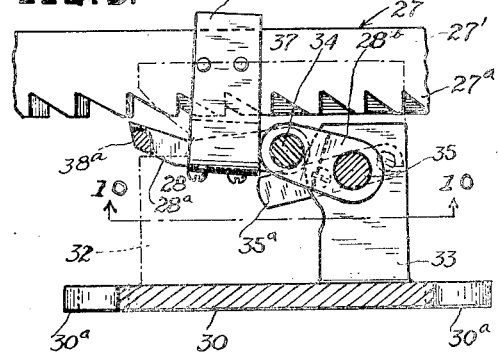
Fig. 9 is a section on the line 9—9 of Fig. 8.
Figure 10:
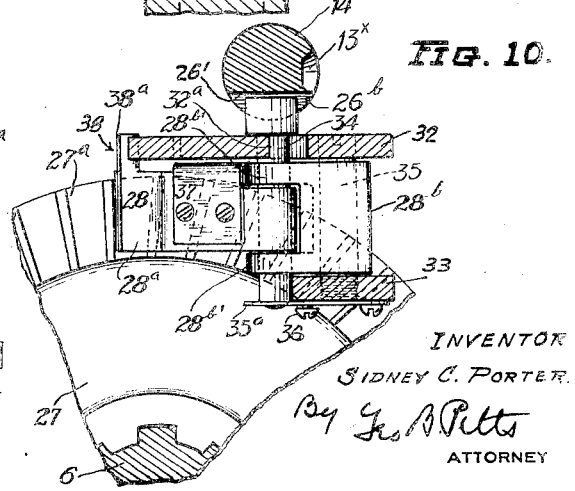
Fig. 10 is a section on the line 10—10 of Fig. 9.

Fig. 7 may also be considered to illustrate the position of the pawl members 28a, 28b, when the vehicle, after being driven forwardly, has been brought to a stop and allowed to gravitate rearwardly. For example, when the vehicle is driven forwardly the pawl members 28a, 28b, occupy the position shown in Figs. 6 and 9; if then the vehicle is stopped and for any reason it moves rearwardly, as indicated by the arrow x in Fig. 7, the member 27 will move the device 37 in the direction indicated by arrow x and the latter in turn will swing the pawl member 28a from its active position (Figs. 6 and 9) into engagement with the teeth 27a, as shown in Fig. 7 and thus stop the vehicle from moving rearwardly; upon rotation of the member 27 in the forward direction the pawl member 28a will be quickly moved to its active position (Figs. 6 and 9).

The pawl 28 is associated with the plunger 14 which effects driving of the shaft 6 in "reverse" or in "low". In this arrangement, the plunger 14 may be moved from "reverse" to "neutral" (the latter position being shown in Fig. 8) and back again without changing the position of the pawl members 28a, 28b; however, if the plunger 14 is shifted from "neutral" to "low" (Fig. 7) the pawl members 28a, 28b, will be moved to the Fig. 7 position as already set forth. After the plunger 14 has been shifted to "low", it may be shifted to "neutral" and the shaft 6 may be connected in "second" or "high" and again in "low" without changing the position of the pawl members. Accordingly, it will be seen that the position of the pawl members is only changed when the gear shift lever changes the driving connection for the shaft 6 from "high", "second" or "low" to "reverse" and when the shift lever changes the driving connection from "reverse" to "low", my construction being preferably arranged to operate in this manner since it is always advisable to shift from "reverse" into "low" speed before shifting into "second" or "high".

38 indicates a guide means for the pawl member 28a. The guide means preferably comprise a lug 38a upstanding from the free end of the pawl member 28a and a wall 38b on which the lug may slide when the pawl member is moved from its inactive position to its active position or into engagement with the teeth 27a. As shown in Figs. 5, 6 and 7, the wall 38b extends at an angle to the plane of the member 27 so as to guide the pawl nose into the teeth 27a as they move toward the pawl. The web 32 is preferably cut-away to provide the wall 38b; the opposite wall of the cut-away forming a stop to limit the outward movement of the pawl member 28a by reason of the engagement of the device 37 with the periphery 27' when the member 27 is rotating forwardly.

From the foregoing description it will be noted that the actuating device 37 is connected directly to the pawl member 28a and bears directly on the rotatable member 27; as the pawl member 28a engages and disengages the member 27 and for that reason must be in close relation thereto, it will be seen that slight rotative movement of the member 27 in either direction will effect both positive and quick movement of the pawl member 28a. This is especially advantageous in actuating the pawl member 28a from its active position (Figs. 6 and 9) into engagement with the ratchet teeth 27a, as it is desirable to stop rearward movement of the vehicle immediately following any slight movement in that direction.

Where the shaft to be controlled is driven in one direction only, the pawl 28 may comprise a single pivotally mounted member, but where the shaft is to be driven in opposite directions, the pawl preferably comprises a pair of pivotally connected members, as above described. By making the pawl 28 in two pivoted together parts, the teeth engaging member 28a of the pawl is moved to and from its active position in an inclined direction relative to the teeth 27a. This form of construction is advantageous as it permits ready disengagement of the pawl engaging member from the member 27 at all times. The cut-away 26' is so arranged that the thrust wall 26a does not act on the pin 34 to swing the pawl member 28b until after the gears 20 and 21 start to mesh; accordingly, when or so long as the member 27 is rotating rearwardly, the pawl 28 cannot be re-engaged therewith. If however, the gears 20 and 21 are forced into mesh during rearward rotation of the member 27, the nose of the pawl member 28a will ride on the tips of the teeth 27a, instead of dropping into them, due to the fact that this member is moved toward the teeth at an inclination thereto and in opposition to their direction of movement and is held against inward movement or complete engagement with the teeth by the guide wall 38b. It will also be noted that in my construction, it is not necessary to move the car forwardly to position the pawl in operative relation to the member 27, following the rotation of the latter in the rearward direction. For example, if the car is driven backwardly down a grade and then stopped on the grade and it is desired to drive the car up the grade, it is only necessary to shift the gears from "reverse" to "low", which operation throws the pawl into engagement with the member 27 and permits the driver to supply fuel to the engine without applying either his service or emergency brake. Also, when it is desired to manually move the car on a level surface, as in a garage, it is only necessary to shift the gears into "reverse" and then back to "neutral", as in this latter position of the gears the car may be moved in either direction and the pawl 28, by the shift to "reverse" is moved into its inactive position. Accordingly, my control means may be so set that the car may be manually moved in either direction freely.

It will also be noted that in driving the vehicle up grade it may be stopped and started without using either the emergency or service brake, my control mechanism serving to hold the vehicle against gravitation after being brought to a stop, so that it is only necessary for the driver to supply fuel to the engine to start the vehicle. Accordingly, as the driver in starting the vehicle on an upgrade does not have to shift his foot from the service brake to the accelerator, stopping and starting on upgrades or hills is greatly facilitated and gravitation backwards and danger of accidents incident thereto are entirely eliminated.

To those skilled in the art to which my invention relates many changes in construction and widely differing embodiments and applications of the invention will suggest themselves without departing from the spirit and scope thereof. My disclosures and the description herein are purely illustrative and are not intended to be in any sense limiting.

What I claim is:

1. In apparatus of the class described, the combination with a shaft, of a member connected to and rotated by said shaft and having an annular series of ratchet teeth on one of its side faces, a pawl mounted to swing about a vertical axis and arranged to engage said ratchet teeth to lock said member against movement in one direction and disengage said teeth to permit its movement in the opposite direction, and a device frictionally engaging said member and controlled thereby and connected to said pawl for operating it according to the direction of movement of said member.

2. In apparatus of the class described, the combination with a transmission mechanism for a self-propelled vehicle having a shifting element, of a member connected to and rotated by an element adapted to be driven by said mechanism in either direction according to the direction of movement of the vehicle, a device disposed in active position relative to said member in one predetermined position of said shifting element and arranged to engage and disengage said member, said device having an element frictionally engaging with and controlled by said member for moving said device into engagement therewith or disengaging it therefrom according to the direction of movement of said member, and an operating connection between said shifting element and said device arranged to move the latter into inactive position when said element is moved to "reverse", and permitting movement of the said shifting element from its said operated position to "neutral" without affecting the position of said device.

3. In apparatus of the class described, the combination with the shaft of a self-propelled vehicle, a change speed and reverse mechanism for said shaft and shift means for said mechanism, of a member connected to and rotated by said shaft in either direction according to the direction of movement of the vehicle, locking means arranged when in active relation to said member to engage and disengage therewith, a device engaging said member and operated thereby in opposite directions from one position to another according to its direction of movement and connected to the element of said locking means that engages and disengages said member to operate it, and an operating connection between said shift means and said locking means arranged to move the latter into an inactive position when said shift means are moved to "reverse" position, and permitting movement of the said shift means from its said operated position to "neutral" without affecting said locking means.

4. In apparatus of the class described, the combination with the shaft of a self-propelled vehicle, a change speed and reverse mechanism for said shaft and shift means for said mechanism, of a member connected to and rotated by said shaft in either direction according to the direction of movement of the vehicle, a locking device arranged to engage and disengage said member, said device carrying an element frictionally engaging said member and operated thereby in opposite directions from one position to another according to its direction of movement, and operating connections between said shift means and said locking device arranged to move the latter into an inactive position when said shift means are moved to "reverse" position or into an active position to engage said member when said shift means is moved to "low" position, the engaging elements of said connections between said shift means and said locking device being relatively movable to permit movement of said shift means from any of its operated positions to "neutral" without affecting the position of said locking means.

5. In apparatus of the class described, the combination with a vehicle having a shaft in driving relation with the vehicle wheels, a change speed and reverse mechanism arranged to be connected to and disconnected from said shaft and shift means for said mechanism, of a member fixed to and rotated by said shaft, means arranged to engage said member to lock it against movement in one direction and to disengage said member to permit its movement in the opposite direction, the engagement with and disengagement of said means from said member being controlled by the latter according to its direction of movement, said means being movable to an inactive position, and operating connections between said locking means and said shift means for moving said locking means into its inactive position when said shift means is moved to reverse driving position and for moving said locking means into active position to engage said member when said shift means is moved into one of its forward driving positions, said operating connections comprising a projection on one element of said locking means and walls on one element of said shift means one of which engages said projection to move said locking means when said shift means is moved in one direction, said walls being spaced apart to permit operation of said shift means from any of its operated positions to "neutral" without changing the position of said locking means.

6. In apparatus of the class described, the combination with a vehicle having a shaft connected to the vehicle wheels, a member fixed to said shaft and provided on one side face with ratchet teeth, a pawl mounted on a pivot to swing laterally about a vertical axis to engage and disengage said teeth, a device connected to said pawl and extending laterally therefrom and yieldingly engaging the periphery of said member, whereby the latter will act through said device to swing said pawl into engagement with or disengagement from said teeth according to the direction of movement of said member.

7. In apparatus of the class described, the combination with a shaft adapted to be connected in driving relation to the wheels of a vehicle, of means to prevent rotation of said shaft in the direction of movement of the vehicle rearwardly, said means consisting of a member fixed to said shaft and provided with an annular rack and a pawl, said pawl comprising an inner pivoted member and an outer member pivotally connected to said inner member and arranged to engage and disengage said rack, a device carried by said outer pawl member and frictionally engaging the member fixed to said shaft, whereby said member will act through said device to move said outer member into or out of engagement with said rack, and means for swinging said inner member about its pivot to move said outer member into an inactive position or into operative relation to the member fixed to said shaft, said outer member being movable in a direction inclined to the plane of said rack.

8. In apparatus of the class described, the combination with a shaft connected in driving relation to certain of the wheels of a vehicle, of a member connected to and rotated by said shaft, a locking member movable to an inoperative position or operative position, said locking member when in the last mentioned position being arranged to engage and disengage said rotated member, a device controlled by said rotated member for operating said locking member according to the direction of movement of said rotated member, and means for yieldably holding said locking member in either of its operated positions.

9. In apparatus of the class described, the combination with a shaft, means for driving said shaft in opposite directions and means for connecting said shaft to said driving means to rotate it in either direction, of a member connected to and rotated by said shaft and provided on one of its side faces with an annular series of ratchet teeth, a pawl comprising inner and outer pivotally connected sections, the inner section being mounted to swing about a vertical axis and the outer section being arranged to engage said ratchet teeth to lock said member against movement in one direction and disengage said teeth to permit its movement in the opposite direction, a device engaging said member and controlled thereby and connected to said outer pawl section for operating it independently of said inner pawl section according to the direction of movement of said member, and means actuated by said connecting means for moving said pawl to an inoperative position.

10. In apparatus of the class described, the combination with a shaft, means for driving said shaft in opposite directions and shift means for connecting said shaft to said driving means to rotate it in either direction, of a member connected to and rotated by said shaft and provided on one of its side faces with an annular series of ratchet teeth, a pawl swingable into engagement with said teeth to lock said member against reverse movement and to disengage said teeth to permit of such reverse movement, a device connected to said pawl and frictionally engaging a portion of said member whereby the latter operates said pawl into engagement with said teeth or out of engagement therewith according to the direction of movement of said member, connections between said shift means and said pawl arranged to move it to an inoperative position when said shift means is operated to drive said shaft in the reverse direction, and means for guiding the free end of said pawl at an inclined angle to said teeth.

11. In apparatus of the class described, the combination with a shaft, change speed and reverse driving means for said shaft, means for shifting said mechanism to effect driving forwardly at different speeds and in the reverse direction, of a member connected to and rotated by said shaft and provided on one of its side faces with an annular series of teeth, a pawl mounted to swing about a vertical axis and arranged to engage said teeth to lock said member against movement in the reverse direction and disengage said teeth to permit its movement in such reverse direction, a device engaging a portion of said member and controlled thereby and connected to said pawl for operating it according to the direction of movement of said member, connections between said shift means and said pawl arranged to permit operation of the latter when said shaft is connected for driving forwardly at one of the change speeds and to prevent its operation when said shaft is connected for driving reversely, and means for guiding the free end of said pawl at an angle inclined to the plane of said member.

12. In mechanism of the class described, the combination with a shaft connected in driving relation to certain of the wheels of a vehicle, of a member connected to and rotated by said shaft in either direction and having a series of ratchet teeth on one of its side faces, a pawl comprising pivotally connected sections, the inner section being mounted to swing about a vertical axis and the outer section being arranged to engage and disengage said teeth, means for swinging said inner pawl section about its axis, a device connected to said outer pawl section and normally engaging a portion of said member and actuated by the latter to move said outer pawl section into engagement with an disengagement from said teeth according to the direction of rotation of said shaft, and means cooperating with said device to guide said outer section into and out of engagement with said teeth.

SYDNEY C. PORTER.